(12) United States Patent
Flett et al.

(10) Patent No.: US 12,164,364 B2
(45) Date of Patent: Dec. 10, 2024

(54) DEVICE POWER CONTROLLER

(71) Applicant: NCR Atleos Corporation, Atlanta, GA (US)

(72) Inventors: Graham Flett, Dundee (GB); Brian Steven Wotherspoon, Fife (GB)

(73) Assignee: NCR Atleos Corporation, Atlanta, GA (US)

( * ) Notice: Subject to any disclaimer, the term of this patent is extended or adjusted under 35 U.S.C. 154(b) by 0 days.

(21) Appl. No.: 18/086,933

(22) Filed: Dec. 22, 2022

(65) Prior Publication Data
US 2024/0211022 A1    Jun. 27, 2024

(51) Int. Cl.
*G06F 1/00*    (2006.01)
*G06F 1/3234*    (2019.01)
*G06F 1/3296*    (2019.01)
*G06F 1/3203*    (2019.01)

(52) U.S. Cl.
CPC .......... *G06F 1/3296* (2013.01); *G06F 1/325* (2013.01); *G06F 1/3203* (2013.01)

(58) Field of Classification Search
CPC .............................. G06F 1/3296; G06F 1/325
USPC ........................................................ 713/323
See application file for complete search history.

(56) References Cited

U.S. PATENT DOCUMENTS

| | | | |
|---|---|---|---|
| 6,308,887 B1 | 10/2001 | Korman et al. | |
| 6,418,526 B1 * | 7/2002 | Denman | G06F 9/5061 713/400 |
| 2005/0120256 A1 * | 6/2005 | Lu | G06F 1/3218 713/324 |
| 2008/0189563 A1 * | 8/2008 | Itkin | G06F 1/3203 713/300 |
| 2011/0239256 A1 * | 9/2011 | Gholmieh | H04W 72/30 725/62 |
| 2011/0307727 A1 * | 12/2011 | Wu | H04W 52/0229 713/323 |
| 2012/0017101 A1 * | 1/2012 | So | G06F 1/3203 713/300 |
| 2013/0290757 A1 | 10/2013 | Barlow et al. | |
| 2014/0157026 A1 | 6/2014 | So et al. | |

(Continued)

OTHER PUBLICATIONS

"European Application Serial No. 23218296.4, Extended European Search Report mailed May 24, 2024", 10 pgs.

*Primary Examiner* — Volvick Derose
(74) *Attorney, Agent, or Firm* — Schwegman Lundberg & Woessner, P.A.

(57) ABSTRACT

An agent on a terminal send an instruction to firmware on a miscellaneous board of the terminal. The instruction includes a time period during which power to the terminal and peripherals of the terminal are to be powered off. The agent sends an instructions to a core of a motherboard of the terminal to perform shutdown operations in anticipation of the terminals and peripherals being powered off. In response to the instruction received, the firmware monitors the core for a state indicating that the core is shutdown, the firmware sets a timer to the time period, and causes power to be cut between the motherboard and a power supply unit of the terminal. When the timer expires, the firmware re-establishes power between the motherboard and the power supply unit causing the core to initiate the proper sequence of operations to start up the terminal and the peripherals.

8 Claims, 3 Drawing Sheets

(56) References Cited

U.S. PATENT DOCUMENTS

| | | | | |
|---|---|---|---|---|
| 2015/0215566 A1* | 7/2015 | McRae | ............... | H04N 5/63 |
| | | | | 348/730 |
| 2015/0233985 A1* | 8/2015 | Chen | ............... | G01R 21/133 |
| | | | | 702/60 |
| 2016/0306411 A1* | 10/2016 | Kumar | ............... | G06F 1/3215 |
| 2017/0064629 A1* | 3/2017 | Tan | ............... | H04W 52/0229 |
| 2018/0129269 A1 | 5/2018 | Garg et al. | | |
| 2020/0367171 A1* | 11/2020 | Tsai | ............... | H04W 52/0216 |
| 2022/0346010 A1* | 10/2022 | Zhou | ............... | H04W 52/0229 |
| 2023/0305834 A1* | 9/2023 | Kumar | ............... | G06F 8/65 |

* cited by examiner

DEVICE POWER CONTROLLER

BACKGROUND

There is a universal need to conserve energy for a variety of reasons such as environmental impacts, energy supply shortages, price increases for energy consumption, etc. In fact, Europe is currently experiencing an energy crisis and the European Union is searching for the correct mix of both voluntary compliance and/or forced compliance for saving energy.

A substantial amount of energy is consumed by idle devices that are not actively being operated. Although a single device's energy consumption during an idle period of time may seem insignificant, the combined energy consumption of idle devices is significant.

Typically, a single enterprise can have many devices located at each of a large number of different venues. Most of the hours during a given day the devices are incapable of being operated because the venues are closed to customers.

Enterprises would like to find a solution to this problem but, unfortunately, the expense associated with more intelligently addressing energy consumption of idle devices is often more costly than it is to make no change to the energy habits of their devices. For example, simply cutting off power to a device at certain times of the day can have detrimental impacts on a transaction terminal because the binary Input/Output (I/O) system (BIOS), operating system, memory, and/or storage of the terminal can become corrupted resulting in expensive repairs.

Although some operating systems may automatically put a device in a hibernation mode after a period of inactivity during which power consumption is reduced, resumption of power based on activity following a hibernated state can cause unexpected issues with hardware/peripheral devices of a terminal. Thus, enterprises do not prefer and typically do not have a hibernation feature activated on their terminals.

SUMMARY

In various embodiments, a device power controller and methods for controlling device power are presented. An agent on a terminal issues a firmware instruction from a motherboard of the terminal to a miscellaneous board connected to the terminal, the instruction includes a time period for powering off the terminal. The agent issues a second instruction on the motherboard to a terminal core to shutdown or power down the terminal and the terminal's peripherals. Upon receive of the instructions by firmware of the miscellaneous board, the firmware monitors the core for an indication that the terminal has shutdown. Once the terminal is shutdown, the firmware cuts power to the terminal from a power supply unit and monitors the timer for expiration. When the timer expires, the firmware re-establishes power between the power supply unit and the terminal causing the core to initiate a power up or a start up set of operations, which initiate and powerup the terminal and the peripherals of the terminals.

DETAILED DESCRIPTION

Figure 1:
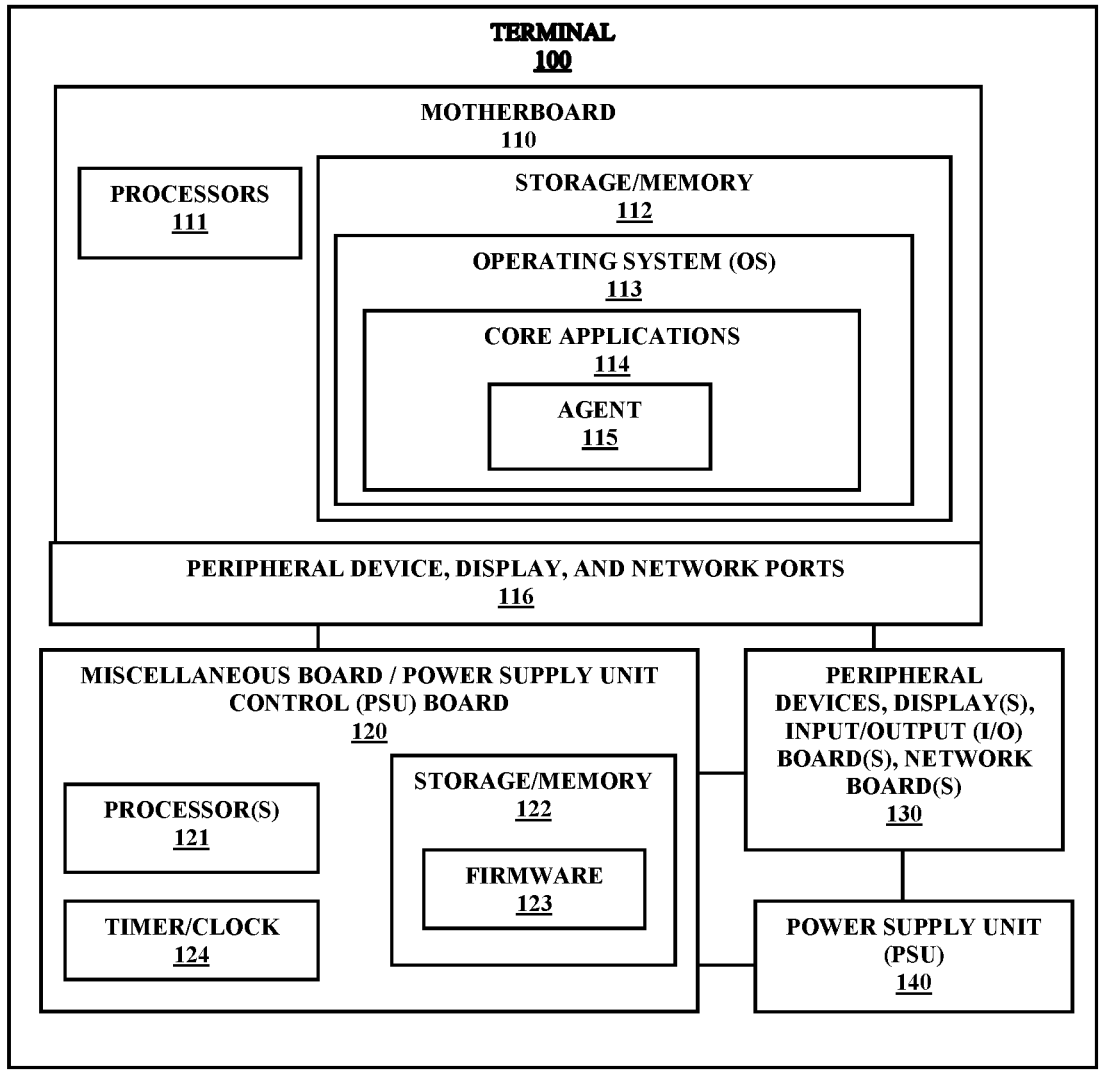
FIG. 1 is a diagram of a system and/or a terminal for controlling power to the terminal, according to an example embodiment.

As stated above, governments and enterprises are searching for techniques to reduce energy consumption. This issue is of import to enterprises with transaction terminals. A transaction terminal is a complex device that includes a variety of peripheral devices, many of which include a variety of electromechanical modules. A self-service terminal (SST) is one type of transaction terminal that can accept and dispense currency to a customer independent of a cashier or teller. As a result, a significant amount of software and hardware integration is needed to ensure that the SSTs are operational and functioning properly. Any small addition or change in the software and/or hardware can disrupt proper SST operation and potentially result in costly maintenance. Hibernation features of operating systems (OSs) have proven ineffective in controlling the energy consumption of SSTs because of unexpected hardware, software, and module failures associated coming out of a hibernated state into an activate state. Moreover, adding software applications into the main process flow of the SST are infeasible because of the development, integration, and compatibility effort required.

The teachings provided herein provide a power controller to a transaction terminal which can be seamlessly integrated into an architecture of the terminal without any addition of hardware and with a minimal software/firmware effort and impact. Firmware is provided on an existing miscellaneous (Misc.) board or power supply unit (PSU) board of the terminal to establish an enhanced Misc. board or PSU board. An SST agent is configured to send a wakeup sleep duration instruction/command to the firmware of the enhanced Misc. board or PSU board. Upon receipt of the instruction/command, the firmware monitors the SST for a controlled shutdown of the SST and the firmware sets a timer to the wakeup sleep duration; the timer is maintained on the Misc. board or PSU board. Once the SST core is shutdown, the firmware cuts power to the SST and its peripheral devices. The SST core can still receive some power due to architectures of SSTs, but the amount of power is very small and the SST core on the motherboard of the SST is not running. This puts the SST in a very low power state.

The firmware waits for the time to expire on the timer, at which point the firmware cycles the power supply to power the SST back up again and ready for use, both the SST core and the SST peripheral devices. This results in both the SST core and the SST peripheral devices powering on in a same sequence that is used for a normal power on operation of the SST ensuring that no unexpected failures occur. That is, the BIOS sequence of operations is ensured to be processed on the SST ensuring the SST initiates properly for operation.

The wakeup duration and any schedule associated with the wakeup duration can be custom set by the agent. For example, an OS scheduled task can be set for the agent to process on the SST. The agent sends the wakeup duration to the firmware, the firmware sets the timer, and monitors to ensure the SST core is shutdown. The agent issues a shutdown command to the SST core, which causes the SST core to perform a controlled sequence of operations to safely shutdown the SST and its peripheral devices. Once shutdown, power is cut to the SST and the SST peripheral devices. When power is restored by the power supply being restored to the SST by the firmware, the SST core starts from a power on sequence of operations to ensure applications and peripheral devices of the SST are initiated in a proper boot sequence (i.e., BIOS sequence) following a shutdown operation. The amount of time that the SST is powered off is controlled by the agent through the wakeup duration, but the firmware of the Misc. board or PSU board controls when the SST core is powered back on through the timer value (i.e., wakeup duration) set on the timer.

FIG. 1 is a diagram of a system 100 and/or a terminal 100 (hereinafter just "terminal 100") for controlling power to the terminal, according to an example embodiment. It is to be noted that the components are shown schematically in greatly simplified form, with only those components relevant to understanding of the embodiments being illustrated. Moreover, the arrangement of the components are presented for purposes of illustration, and it is noted that other arrangements with more of less components can be provided without departing from the teachings presented herein.

Terminal 100 includes a motherboard 110, a Misc. board or PSU board (herein after just "Misc. board") 120, a variety of peripheral devices, displays, I/O broads, and/or network boards, and a PSU 140. The motherboard 110 includes one or more processors 111, non-transitory storage/memory (hereinafter just "medium") 112, and peripheral device, display, and network ports (herein after just "ports") 116. Medium 112 includes executable instructions for core applications (hereinafter just "core") 114 and an agent 115. The instructions when executed by the processor 111 causes the processor to perform operations discussed herein and below with respect to 114 and 115.

Misc. board 120 includes one or more processors, medium 122, and optionally a time or clock 124. Medium 122 includes executable instructions for firmware 123, which when executed by processor 121 causes the processor to perform operations discussed herein and below with respect to 123.

By way of example only, the peripheral devices 130 include a media handling device, at least one display, a touch display, a card reader, a near field communication (NFC) transceiver for contactless card reading, one or more wireless transceivers, a vertical scanner, a horizontal scanner, a bioptic scanner, a handheld scanner, a combined scanner and weigh scale, a weigh scale, a bag scale, a personal identification number (PIN) pad, an encrypted PIN pad, one or more cameras, a keyboard, etc.

In an embodiment, Misc. board 120 includes firmware associated with connecting additional peripherals 130 or devices to the motherboard 110 of the terminal 100 such as a speaker, microphone, light emitting diodes (LEDs), etc. In an embodiment, some or all of the peripherals 130 are connected to the motherboard port 116 via an I/O board.

In an embodiment, a media handling device peripheral 130 can include a variety of modules, such as and by way of example only, a reject box module, an escrow module, an upper transport module, a bill validator (BV) module, a pocket separator module an upper base module, an intermedia transport module, a lower transport module, a cassette holder module, a deposit cassette module, a recycle cassette module, a lower module and an upper module. It is note that other modules may be present as well such as an infeed module that comprises a shutter, a media deskew module, etc. The modules are electromechanical devices that include mechanical components and electrical components that control the mechanical components.

PSU 140 is connected via a cable to the Misc. board 120. The Misc. board 120 is connected via cables to motherboard 110 and peripherals/boards 130. Alternatively, peripherals/boards 130 are connected via cables to PSU 140.

Agent 115 is an OS performs two operations. The first operation is to send an instruction to firmware 123 over port 116 to set a wakeup sleep duration. The second operation is to send a command to the core 114 to perform a shutdown of power set of tasks. The wakeup sleep duration can be hardcoded into the source code of agent 115 or dynamically obtained by agent 115 from a file or an environmental value set in the OS 113 during start up of the terminal 100. In an embodiment, agent 115 can be processed by the OS as a built-in OS scheduled task that the OS 113 processes according to a user-defined schedule, such as every day between 6 p.m. and 6 a.m., etc. In an embodiment, agent 115 is a daemon that continuously runs within the OS 113 at start up and monitors the day of the week, calendar date, and time of day to perform the two operations discussed above; on power up of the terminal 100 the OS loads and initiates agent 115. In an embodiment, agent 115 obtains the wakeup sleep duration and a parameter passed to agent 115; the OS 113 passes the value for the wakeup sleep duration as a parameter to the agent 115 when the OS 113 initiates the agent 115 according to a user-set schedule.

Firmware 123 performs at least five operations. The first operation is to receive a value for a sleep wakeup duration from agent 115 and in response to the value setting a timer. The second operation is to monitor the core 114 for an indication that the core 114 is powered down or shutdown completely. The third operation is to cut power rom the PSU 140 to the terminal 100 and the peripherals 130 when the second operation indicates the core 114 is powered down. The fourth operation is to monitor the elapsed time of the timer until the timer expires (.i.e., reaches a value of 0 when the timer counts down from the sleep wakeup duration value). The fifth operation is to restore power passing through Misc. board 120 to the terminal 100 and the peripherals 130 when the fourth operation indicates the timer expired.

In an embodiment, Misc. board 120 includes a clock 124 that counts down or counts up. Clock 124 is set by, initiated by, and monitored by firmware 123. When the clock counts up, firmware 123 also resets the clock 124 to 0 when a designated wakeup sleep duration value is reached. When the clock 124 counts down from a set value, the clock does not require resetting by firmware 123 since the timer expires for the firmware 123 when the clock reaches 0.

When power is restored to the terminal 100, the core 114 initiates as if it is being powered on normally after having been powered off or shutdown normally. The BIOS sequence of operations to initiate applications and initiate the peripherals 130 are processed in the proper and predefined sequence by the core 114. This ensures that the terminal 100 and its peripherals 130 are properly started and initiated ensuring error-free operation of the terminal 100.

In an embodiment, the core 114 when processing a power down or shutdown set of operations, instructs each of the peripherals 130 to perform shutdown or power down operations. In this way, even when the peripherals 130 are connected directly to the PSU 140, the peripherals 130 power down on instructions from the core 114. Similarly, during start up or power up of the terminal 100, core 114 instructs each of the peripherals 130 to power up or start up to ensure each of the peripherals 130 properly initiate and power up with the core 114. Thus, firmware 120 does not have to control a power feed to the peripherals 130 because core 114 during power down operations ensures that the peripherals 130 are powered down.

In an embodiment, terminal 100 is located indoors in a store of an enterprise. In an embodiment, terminal 100 is located outdoors such that the ambient temperature can damage some of the electromechanical components of a media depository 130. In these latter embodiments, the wakeup sleep duration can be set to a couple hours after which the firmware 123 restores power to the terminal 100 and the terminal interacts with the depository 130 to determine if temperatures require additional action such as idling of the component motors to raise the internal temperature of the depository 130. Once the internal recorded temperatures by the modules of the depository 130 report a sufficient temperature. Agent 115 can again issue another wakeup sleep duration to firmware 123. In this way, energy can be saved without causing damage to components of the peripherals 130.

One now appreciates how seamless, safe, and reliable power control of a terminal 100 can be achieved utilizing existing hardware of the terminal 100. The power control is also achieved with minimal and non-intrusive software (e.g., agent 115) on the terminal 100 and via firmware 123 added to an existing Misc. board to establish an enhanced Misc. board 120. The low and near-zero power state of the terminal 100 and peripherals 130 is controlled via the firmware 123 for a user-defined period of time (i.e., wakeup sleep duration). Enterprises can deploy the techniques presented herein for purposes of reducing their terminal energy consumption without concern for failures or costly approaches.

Figure 2:
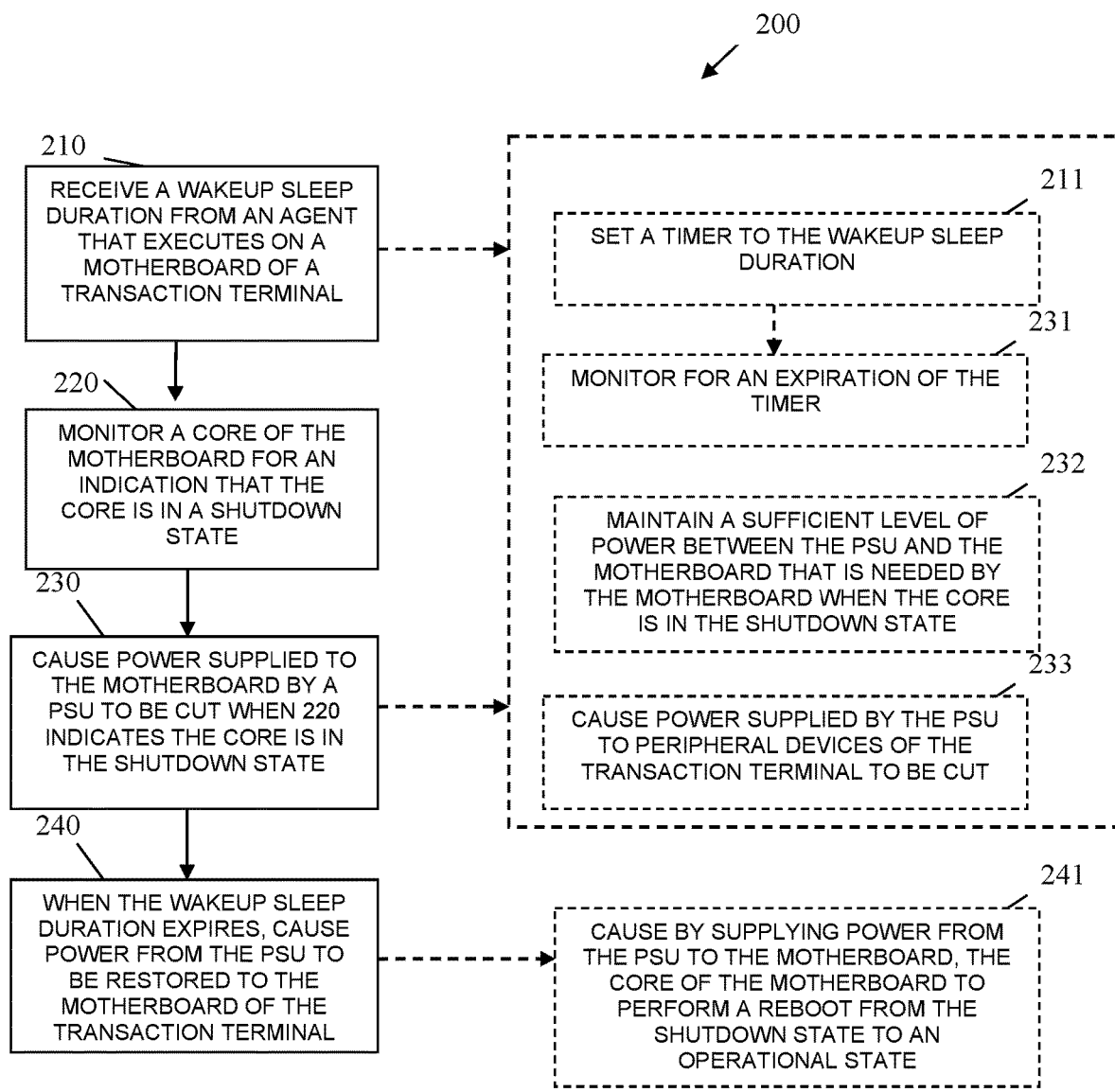
FIG. 2 is a flow diagram of a method for controlling power consumption of a terminal, according to an example embodiment.

The above-referenced embodiments and other embodiments are now discussed with reference to FIGS. 2 and 3. FIG. 2 is a flow diagram of a method 200 for controlling power consumption of a terminal, according to an example embodiment. The software module(s) that implements the method 200 is referred to as "firmware." The firmware is implemented as executable instructions programmed and residing within memory and/or a non-transitory computer-readable (processor-readable) storage medium and executed by one or more processors of one or more devices. The processor(s) of the device(s) that executes the firmware are specifically configured and programmed to process the firmware. The firmware may have access to one or more network connections during its processing or the firmware does not have access nor need any network connection during its processing. Any network connection when available to the firmware can be wired, wireless, or a combination of wired and wireless.

In an embodiment, the device that executes the firmware is Misc. board 120. In an embodiment, the device that executes the firmware is PSU board 120. In an embodiment, the firmware presents another and, in some ways, an enhanced processing perspective from that which was described above for firmware 123 for terminal 100.

At 210, the firmware receives a wakeup sleep duration from an agent 115 that executes on a motherboard 110 of a transaction terminal 100. Receipt of the wakeup sleep duration is an indication to the firmware that the terminal 100 is being shutdown or powered down.

In an embodiment, at 211, the firmware sets a timer to the wakeup sleep duration. The period of time associated with the wakeup sleep duration can be user-defined through a setting or a file that the agent 123 obtains and provides to the firmware. The wakeup sleep duration is a continuous period of elapsed time that the terminal 100 is to be powered down.

At 220, the firmware monitors a core 114 of the motherboard 110 for an indication that the core is in a shutdown state. In an embodiment, the shutdown state is detected by the firmware when the motherboard 110 becomes unresponsive to a request or is providing a shutdown state when pinged by the firmware.

At 230, the firmware causes power supplied to the motherboard 110 by a PSU 140 to be cut when 220 indicates the core is in the shutdown state. It is noted that not one-hundred percent of power is cut as was described above.

In an embodiment of 211 and 230, at 231, the firmware monitors for an expiration of the timer. That is, the firmware monitors the timer until the time is either at zero (when the timer counts down from the wakeup sleep duration) or until the time is at the wakeup sleep duration (when the timer counts up from zero to the wakeup sleep duration).

In an embodiment, at 232, the firmware maintains a sufficient level of power between the PSU 140 and the motherboard 110 that is needed by the motherboard 110 when the core is in the shutdown state. This is a very small amount of power and less power than when an OS 113 of the motherboard 110 is in a hibernation state.

In an embodiment, at 233, the firmware causes power supplied by the PSU 140 to peripheral devices 130 of the terminal 100 when the core is in the shutdown state. This can be when the peripherals 130 are connected to the Misc. control board or 120 PSU control board 120 or this can be achieved by the core performing its sequence of shutdown operations once instructed by the agent 115.

At 240, the firmware, when the wakeup sleep duration expires, causes power from the PSU 140 to be restored to the motherboard 110 of the terminal 100. Power is not resumed by the firmware to the terminal 100 until the wakeup sleep duration has expired.

In an embodiment, at 242, the firmware causes, by supplying power from the PSU 140 to the motherboard 110, the core 114 to perform a reboot from the shutdown state to an operational state. The BIOS of the terminal 100 is executed to properly load the OS 113, applications associated with the core 114, and to initiate the peripherals 130 of the terminal 100.

Figure 3:
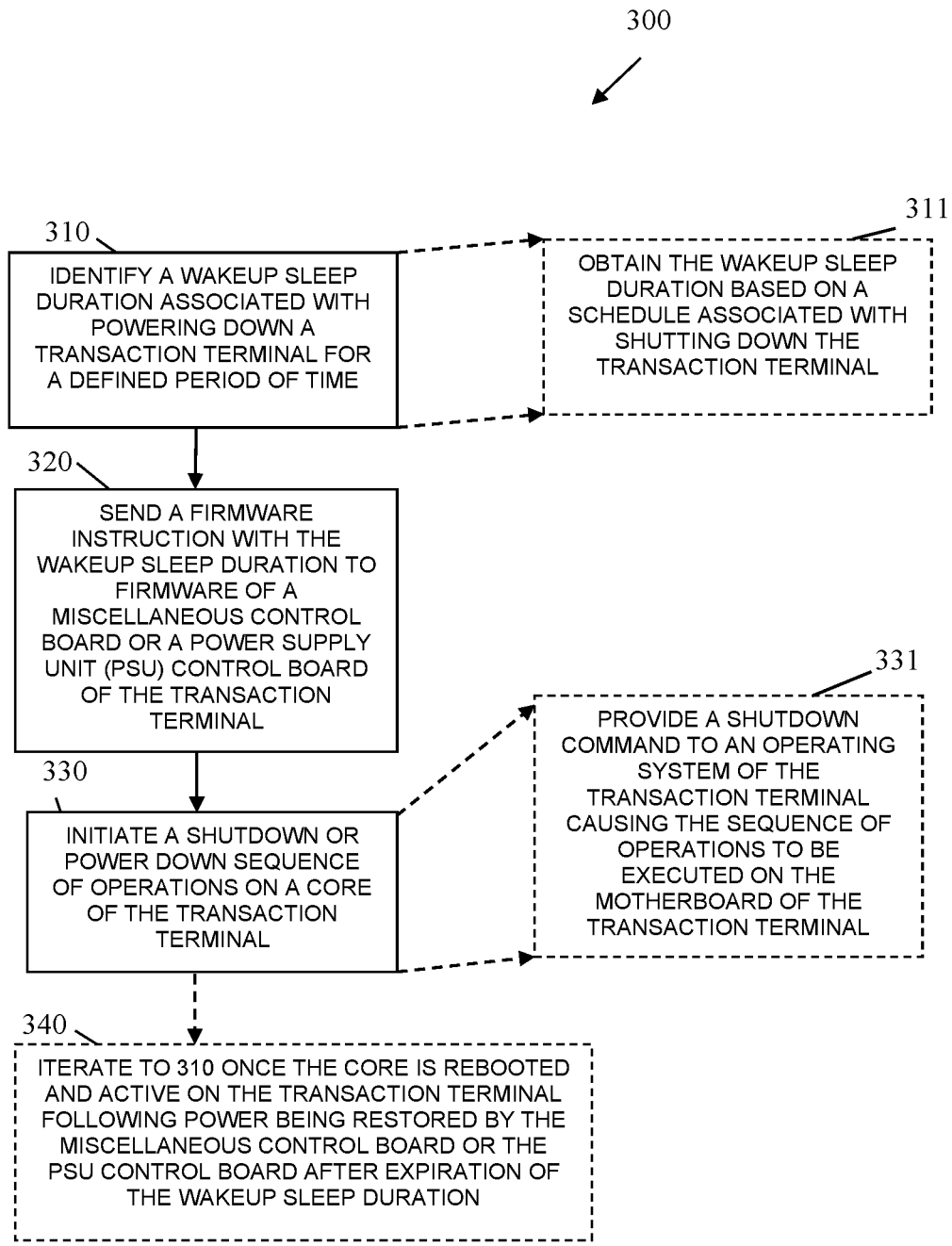
FIG. 3 is a flow diagram of another method for controlling power consumption of a terminal, according to an example embodiment.

FIG. 3 is a flow diagram of another method 300 for controlling power consumption of a terminal, according to an example embodiment. The software module(s) that implements the method 300 is referred to as a "terminal agent." The terminal agent is implemented as executable instructions programmed and residing within memory and/or a non-transitory computer-readable (processor-readable) storage medium and executed by one or more processors of one or more devices. The processor(s) of the device(s) that executes the terminal agent are specifically configured and programmed to process the terminal agent. The terminal agent may have access to one or more network connections during its processing or the terminal agent does not have access nor need any network connection during its processing. Any network connection when available to the terminal agent can be wired, wireless, or a combination of wired and wireless.

In an embodiment, the device that executes the terminal agent is motherboard 110 of terminal 100. In an embodiment, the terminal agent presents another and, in some ways, an enhanced processing perspective from that which was described above for agent 115 of terminal 100.

At 310, the terminal agent identifies a wakeup sleep duration associated with powering down or shutting down a transaction terminal 100 for a defined period of time. The terminal agent can be a daemon that continuously executes on the motherboard 110 within the context of the OS 113 for the terminal 100 and utilizes a schedule to identify the wakeup sleep duration or the terminal agent can be a scheduled set of operations that is initiated by the OS at a scheduled time, at which point the terminal agent identifies the wakeup sleep duration.

In an embodiment, at 311, the terminal agent obtains the wakeup sleep duration based on a schedule associated with shutting down the transaction terminal 100. For example, the schedule may indicate every business day at of 6 p.m.; every 2 hours; Sundays at midnight, etc.

At 320, the terminal agent sends a firmware instruction with the wakeup sleep duration to firmware 123 of a Misc. control board 120 or a PSU control board 120 of the terminal 100. The firmware 123 is separate and external from the motherboard 110 of the terminal 100.

At 330, the terminal agent initiates a shutdown or power down sequence of operations on a core 114 of the terminal 100. In an embodiment, at 331, the terminal agent provides a shutdown command to an OS 113 of the terminal 100. This causes the sequence of operations to be executed on the motherboard 110 of the terminal 100.

In an embodiment, at 340, the terminal agent iterates to 310 once the core 114 is rebooted and active on the terminal 100. This is following power being restored by the Misc. control board 120 or the PSU control board 120 and after the expiration of the wakeup sleep duration. Essentially, this terminal agent has been restarted when the OS 113 was reloaded and initiated within the OS 113 on the motherboard 110 of the terminal 100 and waits for a scheduled time to identify the wakeup sleep duration at 310 and send a next firmware instruction to the firmware 123 at 320.

It should be appreciated that where firmware/software is described in a particular form (such as a component or module) this is merely to aid understanding and is not intended to limit how firmware/software that implements those functions may be architected or structured. For example, modules are illustrated as separate modules, but may be implemented as homogenous code, as individual components, some, but not all of these modules may be combined, or the functions may be implemented in firmware/software structured in any other convenient manner.

Furthermore, although the firmware/software modules are illustrated as executing on one piece of hardware, the firmware/software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A device, comprising:
a processor;
a non-transitory computer-readable storage medium that comprises executable instructions;
the executable instructions when executed by the processor cause the processor to perform operations comprising:
receiving a wakeup sleep duration from a motherboard of a terminal;
setting a timer on the device to the wakeup sleep duration;
monitoring a core of the motherboard for an indication that the core has shutdown applications and peripheral devices associated with the terminal;
when the indication is identified from the monitoring, causing power from a power supply unit (PSU) to be cut to the motherboard of the terminal;
monitoring the timer until the timer expires;
causing power from the PSU to be restored to the motherboard of the terminal resulting in the core restoring operation of the applications and the peripheral devices of the terminal;
wherein the device is a PSU control board of the terminal, or a miscellaneous control board of the terminal;
wherein the PSU control board or the miscellaneous control board includes a first cabled connection to a motherboard port and a second cabled connection to the PSU.

2. The device of claim 1, wherein the PSU control board or the miscellaneous control board includes one or more third cabled connections to the peripheral devices.

3. The device of claim 1, wherein the terminal is a transaction terminal.

4. A device, comprising:
a processor;
a non-transitory computer-readable storage medium that comprises executable instructions;
the executable instructions when executed by the processor cause the processor to perform operations comprising:
receiving a wakeup sleep duration from a motherboard of a terminal;
setting a timer on the device to the wakeup sleep duration;
monitoring a core of the motherboard for an indication that the core has shutdown applications and peripheral devices associated with the terminal;
when the indication is identified from the monitoring, causing power from a power supply unit (PSU) to be cut to the motherboard of the terminal;
monitoring the timer until the timer expires;
causing power from the PSU to be restored to the motherboard of the terminal resulting in the core restoring operation of the applications and the peripheral devices of the terminal;
wherein the terminal is a self-service terminal, an automated teller machine, a self-checkout machine, a kiosk, or a point-of-sale terminal.

5. The device of claim 4 further comprising, a clock controlled by the executable instructions for management of the timer.

6. The device of claim 1, wherein operations associated with the monitoring the core further include:
identifying a shutdown state of the core on the motherboard as the indication.

7. The device of claim 4, wherein operations associated with the causing power from the PSU to be cut further include:
maintaining a sufficient power level to the motherboard that is needed by the motherboard during a shutdown state.

8. The device of claim 6, wherein operations associated with the causing power from the PSU to be restored further include:
   causing power to be restored to the peripheral devices of the terminal.

\* \* \* \* \*